United States Patent [19]

Andrews

[11] Patent Number: 4,958,966
[45] Date of Patent: Sep. 25, 1990

[54] TOOL HOLDER BUSHING

[76] Inventor: Edward A. Andrews, 379 Executive Dr., Troy, Mich. 48083

[21] Appl. No.: 445,995

[22] Filed: Dec. 4, 1989

Related U.S. Application Data

[62] Division of Ser. No. 292,328, Dec. 30, 1988, Pat. No. 4,896,892.

[51] Int. Cl.⁵ .............................................. B23B 31/04
[52] U.S. Cl. .................. 408/239 A; 279/1 A; 279/41 R; 279/83
[58] Field of Search ................ 279/1 A, 9 R, 9 A, 14, 279/41 R, 80, 83; 408/231, 239 A

[56] References Cited

U.S. PATENT DOCUMENTS

| | | | |
|---|---|---|---|
| 1,645,948 | 10/1927 | Galloway et al. | 279/83 |
| 1,765,362 | 6/1930 | Berry | 279/1 A |
| 2,432,860 | 12/1947 | Clatfelter | 279/1 A |
| 2,676,809 | 4/1954 | Smith | 279/83 |
| 3,507,508 | 4/1970 | Andrews | 279/83 |

FOREIGN PATENT DOCUMENTS

| | | | |
|---|---|---|---|
| 2831660 | 3/1979 | Fed. Rep. of Germany | 279/1 A |
| 8101761 | 11/1982 | Netherlands | 408/239 A |
| 2198374 | 6/1988 | United Kingdom | 279/1 A |

*Primary Examiner*—Daniel W. Howell
*Attorney, Agent, or Firm*—Harness, Dickey & Pierce

[57] ABSTRACT

A tubular bushing receives the shank of an elongated tool, such as a boring bar, drill and the like shank tools, for mounting the tool shank within the elongated tool socket bore of a tool holder or turret of a machine tool. A narrow slot formed in the tube wall extends substantially the full length of the bushing parallel to the tube axis. A considerably narrower slit formed in the tube wall extends from each of the opposite ends of the tube to the adjacent ends of the slots. A narrow, flat band extends along the interior of the tube wall, parallel to the tube axis and radially offset relative to the slot. Thus, set screws mounted in the tool socket defining wall and extending transversely of the socket engage either the flat band, to resiliently compress the bushing around the tool shank, or extend through the slot to directly engage the shank, for securing the tool and bushing within the socket. One of the internal and external diameters of the tube may be dimensioned in accordance with the metric system and the other may be dimensioned in accordance with the inch measuring system.

6 Claims, 1 Drawing Sheet

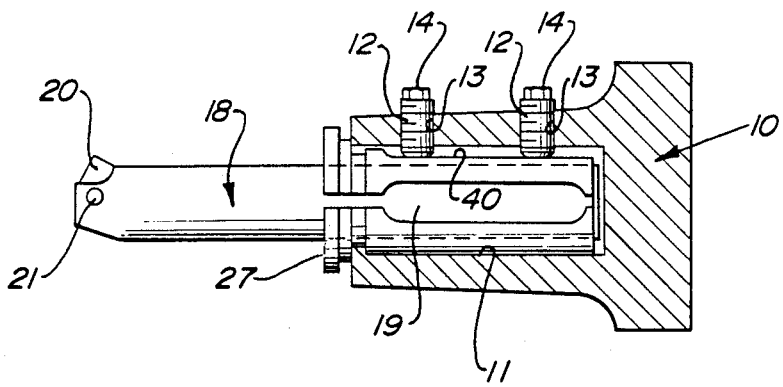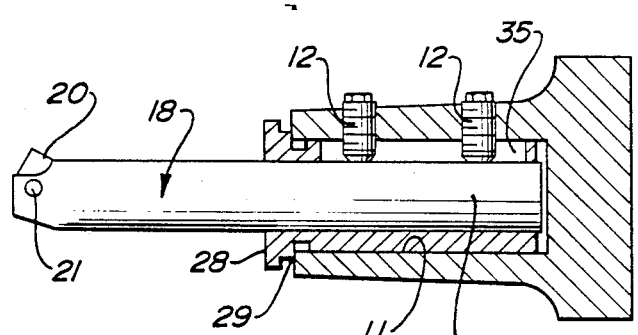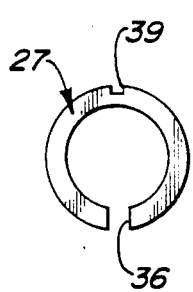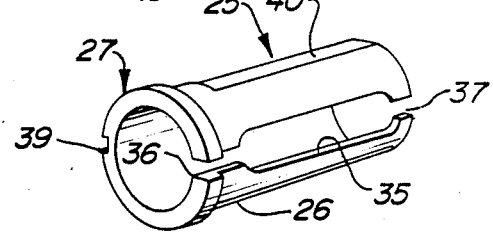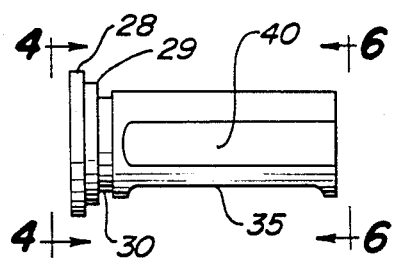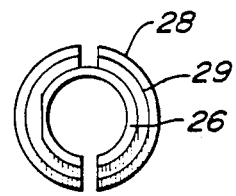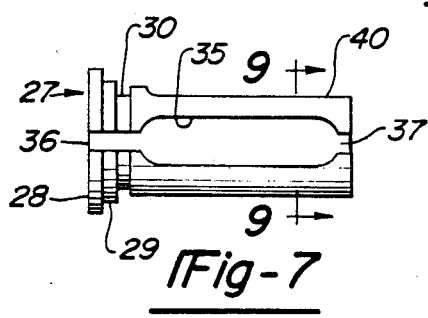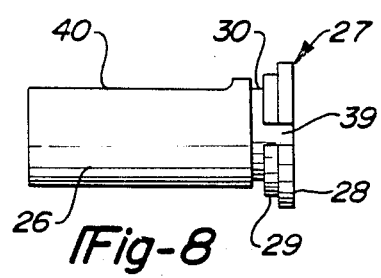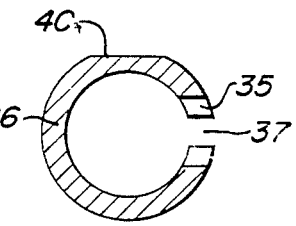

TOOL HOLDER BUSHING

This is a divisional of co-pending application Ser. No. 07/292,328, filed Dec. 30, 1988, now U.S. Pat. No. 4,896,892.

BACKGROUND OF INVENTION

This invention relates to an improved bushing for mounting shank tools, such as drills, boring bars, and the like, within the socket bore of standard machine tool turrets or tool holders.

Conventionally, elongated, shank-type cutting tools are mounted within socket bores formed in machine tool turrets or tool holders used in connection with machine tools. For example, an elongated drill or boring bar has a shank portion which is fitted, coaxially within an elongated socket bore and is clamped within the socket by means of transversely arranged set screws or similar mechanical fasteners. Since the types of cutting tool may vary and their dimensions may vary, depending upon the particular machining job involved, tubular bushings are commonly used for holding the tool within the socket.

Conventional mounting bushings generally are formed of elongated tubes having exterior diameters, that are sized to closely fit within the sockets of a particular machine tool, and varying interior diameters which are sized to receive different size cutting tools. The bushings may be split, that is, slit along their lengths, so that they may be resiliently compressed by the usual set screws which extend transversely into the socket. Thus, with the split, resilient types of bushings, the shank of a cutting tool is frictionally gripped or clamped by the inward, resilient compression of the bushing due to the pressure of the set screws against the surface of the bushing. For that purpose, it is usual to provide a flat band-like area on the exterior of the bushing, against which the set screws or similar fasteners may engage.

In some types of bushings, holes may be formed in the walls thereof, so that the set screws or similar fasteners may extend transversely through the walls of the bushings and engage directly against the shanks of the cutting tools fitted within the bushings. Thus, the tools are directly clamped within the socket and the bushing is similarly held within the socket by means of the screws passing through the holes.

In any particular job-shop type of operation where the machine tools are used for different jobs, from time to time, and utilize different cutting tools, it is necessary to stock a large number of different bushings to accommodate the different size tools. In addition, since the locations of the set screw or screw fasteners in the sockets may vary from one type of machine tool to another, a collection of bushings must be maintained for each different machine tool. Consequently, it may be necessary for a particular shop to inventory a considerable number of bushings in order to provide the flexibility needed for different machining jobs.

This invention is concerned with an improved bushing which can be universally used, that is, used within different sockets whose fastening set screws may be differently located than the screws in the sockets of another machine tool. Consequently, the number of bushings needed in stock may be substantially reduced.

SUMMARY OF INVENTION

This invention relates to a tool mounting bushing for holding the elongated shank of a cutting tool within the socket bore of a turret or tool holder, and which may be optionally clamped therein by either the pressure of set screws against the exterior of the bushing or by passing the set screws through an elongated slot in the bushing wall for directly engaging the tool shank. A single, elongated, narrow slot extends substantially the full length of the bushing and narrow slits extend from the opposite ends of the slot to the adjacent ends of the tube. A flat band is formed on the exterior of the tube wall, radially offset from the slot and parallel to it. Thus, the clamping screws may engage the flat band and cause the bushing to resiliently compress, due to the elongated slot and its end slits, for tightly gripping the tool shank and holding it. Alternatively, the screws may pass through the slot, regardless of the different distances that may be found between different set screws of differing machine tool sockets and may directly engage the shank for clamping it in place and for simultaneously holding the bushing in place due to the clamping pressure.

One object of this invention is to provide a tool mounting bushing which can be more universally used in different tool holder mounting sockets, so as to reduce the needed inventory of bushings in a particular shop.

Another object of this invention is to provide a relatively inexpensive bushing which is split lengthwise to provide resilient, radially inward compressibility upon application of set screw pressure. The split is widened for most of its length so as to additionally function as an elongated opening through which the tool holder set screws may extend for clamping against the cutting tool shank regardless of varying spacing between the screws on different tool holder mounting sockets.

Still a further object of this invention is to provide bushings which may be utilized for mounting cutting tools that are made in accordance with either the inch or the metric measuring system within tool holder sockets that are dimensioned in the opposite system. Thus, by stocking a pair of bushings, one completely dimensioned either to the inch or metric system and the other dimensioned in both the inch and metric systems, a particular tool holder socket may optionally be adapted to receive either a cutting tool of the same measuring system or, alternatively, a cutting tool of the opposite measuring system. This dual dimensioning increases the flexibility of a particular machine tool in that it can be easily adapted to cut metal parts either in accordance with its own dimensional system or in accordance with the opposite dimensional system.

Yet another object of this invention is to considerably increase the resilient flexibility of a tool-mounting bushing by combining an elongated screw clamp slot with end slits along one side of the bushing and with a similar notch or slit in the head of the bushing along the opposite side, whereby the bushing may be more easily inserted within and removed from a socket and will more tightly clamp a tool within the socket.

These and other objects and advantages of this invention will become apparent upon reading the following description, of which the attached drawings form a part.

DESRIPTION OF DRAWINGS

FIG. 1 is an elevational view of a bushing mounting the shank of a boring bar within the tool-mounting socket of a turret, which socket is schematically shown in cross-section.

FIG. 2 is a view similar to FIG. 1, but illustrating the bushing in cross-section and showing the socket-clamping screws extendig through the slot in the bushing.

FIG. 3 is a perspective, front and side elevational view of the bushing.

FIG. 4 is an end view of the bushing taken in the direction of Arrows 4—4 of FIG. 5.

FIG. 5 is a top, plan view of the bushing.

FIG. 6 is an end view of the bushing taken in the direction of Arrows 6—6 of FIG. 5.

FIG. 7 is a side elevational view of the bushing, showing the elongated slot and its end slits.

FIG. 8, is an elevational view of the opposite side of the bushing to that shown in FIG. 7.

FIG. 9 is an enlarged, cross-sectional view taken in the direction of Arrows 9—9 of FIG. 7.

DETAILED DESCRIPTION

FIGS. 1 and 2 schematically illustrate, in cross-section, a section of a machine tool turret or tool holder 10 for mounting cutting tools. An elongated socket bore 11 is formed in the turret or tool holder. The size and shape of the socket bore and its surrounding machine tool holder element varies from one machine to another. For example, the overall machine tool holder element may comprise a large disk having radially inwardly directed bores formed in its peripheral edge. Alternatively, bores that are parallel to the axis of the disk may be formed in the disk adjacent its peripheral edge. The particular size and shape of the machine tool element or tool holder which provides the socket bore may vary considerably.

Conventionally, the socket bores are provided with transversely arranged set screws or clamp screws 12 which are threadedly engaged through threaded holes 13 formed in the wall defining the socket. The screws may have wrench or screwdriver-receiving heads 14 for turning the screws. The distances between the screws will vary on different machines and the particular style or shape of screws may also vary.

Cutting tools 18 are mounted upon the turret or tool holder. A particular machine tool may have a number of sockets in a turret for mounting a number of different cutting tools, such as boring bars, different kinds of drills, or different size drills and the like. By way of example, the cutting tool illustrated in FIGS. 1 and 2 is in the form of a boring bar. This cutting tool includes an elongated mounting shank portion 19 adapted for insertion within the tool-mounting socket. A cutting tip, as for example, a conventional carbide insert 20, is secured upon the outer end of the boring bar and held in place by a set screw 21. As an alternative example, the tool may be an elongated drill having a shank portion for fitting within the socket.

The improved bushing 25 is formed of an elongated, thin wall, metal tube 26. An annular rim 27 is formed on the outer end of the tube. The rim comprises an outer enlarged, annular section 28, an inner section 29 which is of a lesser diamater than the outer section, and an annular groove 30. The inner rim section 29 is adapted to engage, in face-to-face, annular contact, with the surface which defines the opening of the socket bore.

The annular groove provides clearance for chips or particles which may interfere with the face-to-face contact between the rim inner section and the area around the socket.

An elongated, uniform width, narrow slot 35 extends almost the full length of the bushing tube. A much narrower slit 36 is formed in the tube wall, through the outer end portion of the tube and the rim. The slit 36 opens into the outer end of the slot 35. Similarly, a narrow slit 37 is formed in the tube wall at the inner end of the bushing. Preferably, a notch or slit 39 is formed in the rim 27 in the area diametrically opposite to the location of the slit 35. (See FIGS. 4 and 8.)

An elongated, flat, narrow band 40 is formed on the outer surface of the tube and extends a substantial portion of its length. The band is radially offset relative to the slot 35. Preferably, the offset is about 90°, although it may be varied somewhat.

In operation, the bushing 35 is inserted in the elongated socket bore 11 with the cutting tool shank 19 positioned within the bushing. In one mounting option, the flat band 40 of the bushing is arranged adjacent the socket set screws 12. Thus, when the set screws or clamp screws are tightened against the flat band, the bushing is resiliently compressed for tightly gripping the shank and fixing the bushing and the cutting tool shank within the socket. For resiliency of the bushing, a good quality somewhat spring steel should be used. The selection of a suitable steel can be made by one skilled in the art.

As an alternative use option, the bushing is turned so that the set screws extend through the slot 35 and clamp directly against the cutting tool shank, as illustrated in FIG. 2. The pressure of the set screws fixes the shank within the bushing and, simultaneously, secures the bushing within the socket. Because of the continuous, elongated opening shape of the slot, it can receive the conventional screws that are found in tool holder sockets even though the spaces between the set screws may vary. Thus, the bushing may be universally used within a number of different sockets on different machine tools. Moreover, the springiness of the metal is greatly enhanced by the substantial cut-out of the tube due to the length and width of the slot 35.

In addition, it is contemplated to form the outer diameter and inner diameter of the bushing of dissimilar measuring system dimensions. For example, the outer diameter may be formed of a metric dimension and the inner diameter formed of an inch dimension, or vice versa. Likewise, the inner and outer diameters may be formed of the same measuring system, such as both being formed in accordance with the inch system or the metric system. Because of the variation of measuring systems that can be adapted to the bushing, it is possible for a shop to stock a small number of bushings which can adapt a machine tool which is made in accordance with either the inch or metric system to the production of parts dimensioned to the opposite system. With a relatively small expense, the machine tools in a particular shop are easily adapted to either measuring system. Moreover, with the use of these dissimilar dimensional-method bushings, a machine shop can use whatever cutting tools it has in inventory regardless of the measuring system used for dimensioning the tool.

This invention may be further developed within the scope of the following claims. Thus, it is desired that the foregoing description be read as being merely illustrative of an operative embodiment of this invention and not in a strictly limiting sense.

Having fully described one operative embodiment of this invention, it is now claimed:

1. A tool holder bushing for mounting an elongated tool shank coaxially within an elongated socket bore formed within a tool holder, machining turret and the like elements of a machine tool, comprising:

an elongated, cylindrically shaped tube whose length is considerably greater than its diameter, having an outer end and inner end, an exterior diameter and an interior diameter;

means for enabling retention of the bushing tube within the socket, said retention means axially positioned about said tube;

rim means adapted for engaging a surface defining an opening of the socket, said rim means formed with said outer end of said tube, and channel means formed annularly about said tube adjacent said rim means; and one of the exterior and interior diameters being dimensioned in accordance with the inch measuring system and the other being dimensioned in accordance with the metric system, wherein a socket and a tool which are of differing dimensional measuring systems may be optionally used together to mount the tool upon a machine tool.

2. A tool holder bushing as defined in claim 1, and said means for enabling retention including an elongated, narrow slot of substantially uniform width, formed in the tube wall and extending substantially the full length of the tube from the outer end to the inner end;

a narrow slit formed in the tube wall at each end of the tube and extending from its respective end to the slot, with the slits being a number of times narrower than the slot and being substantially aligned with the central axis of the slot.

3. A tool holder bushing as defined in claim 2, and said means for enabling retention further including a narrow, flat band formed on the exterior surface of the tube wall and extending substantially the full length of the tube parallel to the axis of the tube and radially offset relative to the slot;

whereby when the bushing tube is inserted within a socket bore, said screws extending transversely into the bore may clamp against either the flat band or, extend through the slot, and against the tool shank within the bushing.

4. A tool holder bushing as defined in claim 3, and said rim means including an annular ring-like rim formed integral with the outer end of the tube and being of a larger diameter than the interior diameter of the tube.

5. A tool holder bushing group for alternative use in mounting an elongated tool shank coaxially within an elongated socket bore formed within a machine tool element, such as a tool holder, turret and the like, comprising:

each of said bushings being formed of an elongated, cylindrically shaped, somewhat resilient tube whose length is considerably greater than its diameter, and with the tube having an outer end, an inner end, and an exterior diameter and an interior diameter;

means for enabling retention of the bushing tube within the socket, said retention means axially positioned about said tube;

rim means adapted for engaging a surface defining an opening of the socket, said rim means formed with said outer end of said tube, and channel means formed annularly about said tube adjacent said rim means;

one of the bushing tubes having one of its exterior and interior diameters dimensioned in accordance with the inch measuring system and the other diameter dimensioned in accordance with the metric system; and the other bushing tube having both its interior and exterior diameters dimensioned in accordance with the same measuring system, that is, either the metric or the inch system;

whereby tools dimensioned in accordance with one measuring system may be optionally utilized within machine tool holder sockets dimensioned in accordance with the other measuring system or tools having the same dimensional measuring system as the socket may be mounted therein.

6. A tool holder bushing group as defined in claim 5, and said rim means including each of the bushings having an annular, ring-like rim formed integral with its outer end and being of a larger diameter than the exterior bushing of the tube for engaging the surface defining the opening of the socket.

* * * * *